United States Patent
Yeh et al.

(10) Patent No.: US 8,897,386 B2
(45) Date of Patent: Nov. 25, 2014

(54) MULTIPLE-INPUT MULTIPLE-OUTPUT SYSTEMS AND METHODS FOR WIRELESS COMMUNICATION THEREOF FOR REDUCING THE QUANTIZATION EFFECT OF PRECODING OPERATIONS UTILIZING FINITE CODEBOOKS

(75) Inventors: Ping-Cheng Yeh, Taoyuan County (TW); Ling-San Meng, Taoyuan (TW); Pang-Chang Lan, Taoyuan (TW); Chih-Yao Wu, Taoyuan (TW); Yu-Chih Jen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 13/165,481

(22) Filed: Jun. 21, 2011

(65) Prior Publication Data

US 2011/0261897 A1    Oct. 27, 2011

Related U.S. Application Data

(63) Continuation-in-part of application No. 13/024,762, filed on Feb. 10, 2011.

(60) Provisional application No. 61/303,680, filed on Feb. 12, 2010, provisional application No. 61/357,106, filed on Jun. 22, 2010.

(51) Int. Cl.
  *H04L 27/28* (2006.01)
  *H04L 25/03* (2006.01)
  *H04B 7/06* (2006.01)
  *H04L 25/02* (2006.01)

(52) U.S. Cl.
  CPC ....... *H04L 25/03343* (2013.01); *H04L 25/0202* (2013.01); *H04B 7/0639* (2013.01); *H04B 7/0663* (2013.01)
  USPC .......................................................... 375/285

(58) Field of Classification Search
  None
  See application file for complete search history.

(56) References Cited

U.S. PATENT DOCUMENTS 6,400,761 B1 * 6/2002 Smee et al. ................... 375/232
7,676,007 B1 * 3/2010 Choi et al. .................... 375/347

(Continued)

FOREIGN PATENT DOCUMENTS

CN    101291526 A    10/2008
CN    102461000 A    5/2012

(Continued)

OTHER PUBLICATIONS

K. Schober and R. Wichman K. Schober and R. Wichman, T. Koivisto, "Refinement of MIMO Limited-Feedback using Second Best Codeword", IEEE 2009.*

(Continued)

*Primary Examiner* — Chieh M Fan
*Assistant Examiner* — Bahman Badipour
(74) *Attorney, Agent, or Firm* — Birch, Stewart, Kolasch & Birch, LLP

(57) ABSTRACT

A method for reducing the quantization effect of precoding operations utilizing a finite codebook in MIMO systems is provided. First, at the receiver side, downlink channel state information is obtained and a set of indices of precoding matrices within a plurality of finite codebooks are selected accordingly. The selected indices of precoding matrices for each of the finite codebooks and a set of scalar coefficients are transmitted from the receiver to the transmitter. Thereafter, at the transmitter side, at least a first and a second refined precoding matrices are generated based on the selected set of indices of precoding matrices for all of the finite codebooks, and the one or more scalar coefficients and a final precoding matrix is generated at least based on the first refined precoding matrix and the second refined precoding matrix. The final precoding matrix is applied for transmission between the transmitter and the receiver.

20 Claims, 4 Drawing Sheets

(56) References Cited

U.S. PATENT DOCUMENTS

| | | | |
|---|---|---|---|
| 7,961,802 B2* | 6/2011 | Li et al. | 375/260 |
| 8,165,231 B2* | 4/2012 | Sandell | 375/260 |
| 8,194,773 B2* | 6/2012 | Jung et al. | 375/267 |
| 8,300,727 B2* | 10/2012 | Huang et al. | 375/296 |
| 2006/0270360 A1 | 11/2006 | Han et al. | |
| 2008/0037675 A1 | 2/2008 | Lin et al. | |
| 2008/0212461 A1* | 9/2008 | Pande et al. | 370/203 |
| 2008/0219366 A1 | 9/2008 | Lau et al. | |
| 2009/0042618 A1* | 2/2009 | Hedayat et al. | 455/562.1 |
| 2009/0086840 A1 | 4/2009 | Jung et al. | |
| 2009/0110114 A1* | 4/2009 | Onggosanusi et al. | 375/299 |
| 2009/0252091 A1* | 10/2009 | Tang et al. | 370/328 |
| 2009/0274227 A1* | 11/2009 | Kim et al. | 375/260 |
| 2009/0274230 A1* | 11/2009 | Heath et al. | 375/260 |
| 2009/0324226 A1* | 12/2009 | Buchali et al. | 398/76 |
| 2010/0316156 A1* | 12/2010 | Higuchi et al. | 375/267 |
| 2011/0013603 A1* | 1/2011 | Li et al. | 370/338 |
| 2011/0194631 A1* | 8/2011 | Clerckx et al. | 375/260 |
| 2011/0200081 A1* | 8/2011 | Guo et al. | 375/224 |
| 2011/0200139 A1* | 8/2011 | Jen et al. | 375/296 |
| 2011/0261897 A1* | 10/2011 | Jen et al. | 375/285 |
| 2011/0268071 A1* | 11/2011 | Siew et al. | 370/329 |
| 2011/0305263 A1* | 12/2011 | Jöngren et al. | 375/219 |
| 2012/0014424 A1* | 1/2012 | Heath et al. | 375/224 |
| 2012/0113851 A1* | 5/2012 | Schober et al. | 370/252 |
| 2013/0064315 A1* | 3/2013 | Heath et al. | 375/260 |

FOREIGN PATENT DOCUMENTS

| | | |
|---|---|---|
| JP | 2009-296318 A | 12/2009 |
| TW | 399381 | 7/2000 |
| TW | I316339 | 10/2009 |
| WO | WO 99/05807 | 2/1999 |
| WO | WO 2009/013631 A2 | 1/2009 |
| WO | WO 2009/019307 A3 | 2/2009 |
| WO | WO 2009/132601 A1 | 11/2009 |
| WO | WO 2010/125237 A1 | 11/2010 |

OTHER PUBLICATIONS

3GPP, "3rd Generation Partnership Project; Technical Specification Group Radio Access Network; Further Advancements for E-UTRA Physical Layer Aspects (Release 9)", 3GPP TR 36.814, V1.5.0, pp. 1-53, Nov. 2009.

Caire et al., "On the Capacity of Some Channels with the Channel State Information", IEEE Transactions on Information Theory, vol. 45, No. 6, pp. 2007-2019, Sep. 1999.

Choi et al., "Interpolation Based Unitary Precoding for Spatial Multiplexing MIMO-OFDM With Limited Feedback", IEEE Transactions on Signal Processing, vol. 54, No. 12, pp. 4730-4740, Dec. 2006.

Ericsson et al., "Refinements of Feedback and Codebook Design", 3GPP TSG-RAN WG1 #61, R1-103333, 12 pages, Montreal, Canada, May 10-14, 2010.

Huawei, "Extensions to Rel-8 type CQI/PMI/RI feedback using double codebook structure", 3GPP TSG RAN WG1#59bis, R1-100251, 4 pages, Valencia, Spain, Jan. 18-22, 2010.

Love et al., "Limited Feedback Precoding for Spatial Multiplexing Systems", Globecom 2003, IEEE, pp. 1857-1861, 2003.

Love et al., "Limited Feedback Unitary Precoding for Spatial Multiplexing Systems", IEEE Transactions on Information Theory, vol. 51, No. 8, pp. 2967-2976, Aug. 2005.

Shannon, "Channels with Side Information at the Transmitter", IBM Journal, pp. 289-293, Oct. 1958.

Skoglund et al., "On the Capacity of a Multi-Antenna Communication Link With Channel Side Information", IEEE Journal on Selected Areas in Communications, vol. 21, No. 3, pp. 395-405, Apr. 2003.

Vu et al., "MIMO Wireless Linear Precoding [Using CSIT to improve link performance]", IEEE Signal Processing Magazine, pp. 86-105, Sep. 2007.

Vu et al., "On the Capacity of MIMO Wireless Channels with Dynamic CSIT", IEEE Journal on Selected Areas in Communications, vol. 25, No. 7, pp. 1269-1283, Sep. 2007.

HTC Corporation: "Enhanced PMI Indication for Refining MIMO Precoder Codebook", 3GPP TSG-RAN WG1 #60 Feb. 22-26, 2010, San Francisco, US; 3 pages.

3GPP TSG-RAN WG1 #61bis R1-103903, HTC Corporation, "Enhanced PMI Indication for Refining MIMO Precoder Codebook", published on Jun. 2010; pp. 1-5.

* cited by examiner

MULTIPLE-INPUT MULTIPLE-OUTPUT SYSTEMS AND METHODS FOR WIRELESS COMMUNICATION THEREOF FOR REDUCING THE QUANTIZATION EFFECT OF PRECODING OPERATIONS UTILIZING FINITE CODEBOOKS

CROSS REFERENCE TO RELATED APPLICATIONS

This application is a Continuation-In-Part of application Ser. No. 13/024,762, filed Feb. 10, 2011, which claims the benefit of U.S. Provisional application Ser. No. 61/303,680 filed on Feb. 12, 2010. This application also claims priority of U.S. Provisional application Ser. No. 61/357,106, filed on Jun. 22, 2010. The contents of all of the above applications are incorporated herein by reference into the present application.

BACKGROUND OF THE INVENTION

1. Field of the Invention

The invention generally relates to wireless communication systems and methods thereof, and more particularly, to methods for wireless communication for reducing the quantization effect of precoding operations utilizing finite codebooks in multiple-input multiple-output (MIMO) or multiple-input single-output (MISO) systems from a transmitter to a receiver.

2. Description of the Related Art

In wireless communications, multiple-input and multiple-output (MIMO) technology involves the use of multiple antennas at both the transmitter and receiver sides to improve communication performance. MIMO technology offers significant increases in data throughput and link ranges without additional bandwidth or transmit power via higher spectral efficiency and link reliability or diversity. One of the common functions in MIMO technology is precoding, which is a signal processing technique for MIMO communications to exploit the knowledge of the information of the downlink channel quality at the transmitter side. With precoding, the transmitter can transform signals using appropriate precoding matrices and perform power allocation adaptively according to the variation of link quality. It has been shown that precoding can substantially improve the spectral efficiency for MIMO communications.

Precoding is an effective technique improving the performance of MIMO-OFDM systems. In practical systems, the precoding matrices are pre-determined and only the index of the selected matrix is fed back.

Depending on the adopted criteria for assessing link performance, different objective functions exist for the computation of the optimal precoding matrix. For example, the minimum square error (MSE) and the achieved link capacity are two commonly adopted performance measures.

For the operation of precoding in MIMO communication systems, the information of the downlink channel quality generally has to be fed back from the receiver to the transmitter side. In general, precoding may require knowledge of channel state information (CSI) at the transmitter side. To achieve the optimal performance, the full information of the downlink channel quality or the optimal precoding matrix computed by the receiver has to be fed back to the transmitter side. Such signaling process incurs considerable overhead which scales with the number of antennas, i.e., the MIMO mode, and is undesirable in most cases. In current MIMO systems, the approach of codebook-based precoding is adopted to reduce feedback overhead. In codebook-based precoding, a number of selected precoding matrices are known to both the transmitter side and receiver side prior to the transmissions. The receiver simply feeds back the index of the most preferred precoding matrix which yields the best performance based on the measured link quality and the objective function to the transmitter via the feedback channel. For example, if the number of precoding matrices is set to $2^n$, the length of the feedback can be n bits. Codebook-based precoding can substantially reduce the feedback overhead.

Ideally, the size of the codebook should be made as small as possible to reduce receiver complexity and the feedback overhead. However, the link performance is degraded with a small codebook size as the quantization error for the optimal precoding matrix increases in this case. Precoding gain in MIMO systems can be increased by increasing the size of the codebook. However, at the same time the complexity of codeword selection and memory requirements increase exponentially with the number of bits. A tradeoff thus exists when designing the precoder codebook. The approach of utilizing multiple finite-sized codebooks has been proposed. In the multiple-codebook approach, the receiver may feed back the indices of the preferred precoding matrices for each of the adopted codebooks. The transmitter may then construct the precoding matrix by multiplying the precoding matrices indicated by the receiver. However, such multiple-codebook approaches involve the effort of designing and storing new codebooks at both the transmitter and the receiver sides, and still suffer from inevitable quantization errors as the possible choices of the precoders are limited by the product of the respective codebook sizes. Furthermore, the consequence of feedback error corresponding to the codebooks of relatively long feedback periods could severely degrade system performance (e.g., propagation error).

BRIEF SUMMARY OF THE INVENTION

Accordingly, embodiments of the invention provide methods for wireless communication for reducing the quantization effect of precoding operations utilizing a finite codebook in multiple-input multiple-output (MIMO) or multiple-input single-output (MISO) systems from a transmitter to a receiver. In one aspect of the invention, a method for wireless communication in a multiple-input multiple-output (MIMO) system is provided. First, downlink channel state information is obtained at a receiver side. A set of indices of precoding matrices or a set of precoding matrices within a plurality of finite codebooks are determined according to the obtained downlink channel state information at the receiver side. The selected indices of precoding matrices for each of the finite codebooks and one or more scalar coefficients are transmitted from the receiver to the transmitter. Thereafter, at least a first and a second refined precoding matrix are generated based on the selected set of indices of precoding matrices for all of the finite codebooks and the one or more scalar coefficients at the transmitter side, wherein a final precoding matrix is then generated at least based on the first refined precoding matrix and the second refined precoding matrix at the transmitter side. The final precoding matrix is applied for transmission between the transmitter and the receiver.

In another aspect of the invention, an MIMO system is provided which comprises a receiver and a transmitter. The receiver obtains downlink channel state information of a wireless channel and selects a set of indices of precoding matrices or a set of precoding matrices within a plurality of finite codebooks according to the obtained downlink channel state information to transmit the selected indices of precoding matrices for each of the finite codebooks and a set of scalar coefficients. The transmitter is coupled to the receiver and is used for receiving the selected indices of precoding matrices for each of the finite codebooks and a set of scalar coefficients, wherein at least a first and a second refined precoding matrix based on the selected set of indices of precoding matrices for all of the finite codebooks and the one or more scalar coefficients are generated, and a final precoding matrix at least based on the first refined precoding matrix and the second refined precoding matrix is generated, wherein the final precoding matrix is applied for transmission between the transmitter and the receiver.

Other aspects and features of the present invention will become apparent to those with ordinarily skill in the art upon review of the following descriptions of specific embodiments of apparatuses and methods for handling a network initiated detachment procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

Figure 1:
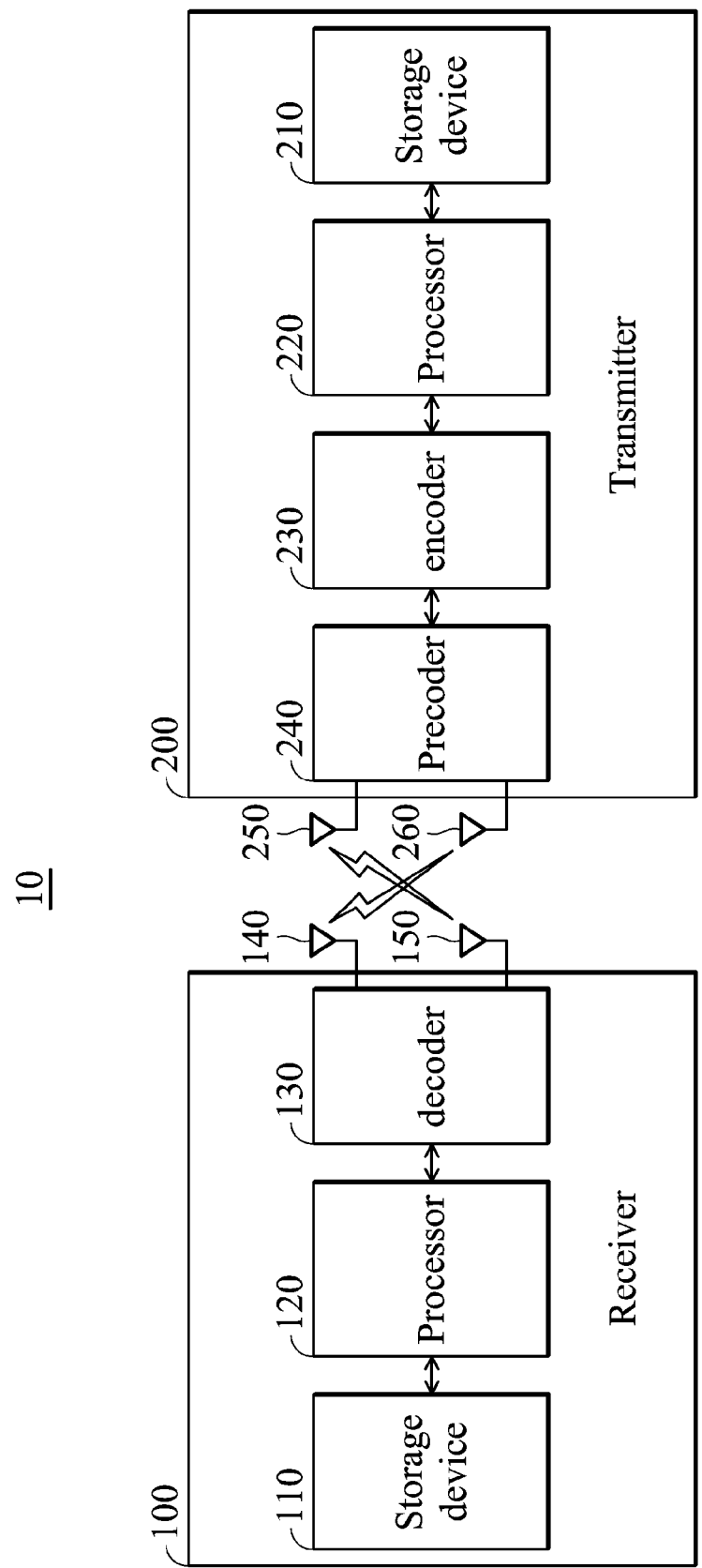
FIG. 1 is a block diagram illustrating a wireless communications system according to an embodiment of the invention.

FIG. 1 is a block diagram illustrating a wireless communications system according to an embodiment of the invention. Particularly, the wireless communications system 10 is a multiple-input multiple-output (MIMO) system and comprises at least a transmitter 200 and a receiver 100. The receiver 100 is wirelessly connected to the transmitter 200 for obtaining wireless services. Generally, the transmitter 200 may be a network/base station, a user equipment (UE) or a mobile station while the receiver 100 may be a UE, a mobile station or a network/base station. For example, the receiver 100 may be a mobile station and the transmitter 200 may be its serving base station. For downlink (DL) transmission, signals are transmitted from the transmitter 200 to the receiver 100. On the transmitter side, the transmitter 200 (e.g., a base station) may comprise a storage device 210, a processor 220, a multiple-input multiple-output (MIMO) encoder 230 that encodes MIMO signals, a precoder 240 for performing precoding operations to precode the encoded signals and multiple antennas 250 and 260. On the receiver side, the receiver 100 may comprise a storage device 110, a processor 120, an MIMO decoder 130 that decodes MIMO signals and multiple antennas 140 and 150.

It is to be noted that, for the precoding operation, the information of the downlink channel quality (e.g. the channel state information (CSI)) has to be fed back from the receiver 100 to the transmitter 200 in the form of limited quantized feedback, where the quantization points may be referred to as precoding codewords or precoding matrices and the set of codewords or precoding matrices form a precoding codebook. The precoding codebook may be predefined in the storage device 210 or configurable by the transmitter 200. The precoding codebook may be broadcasted by the transmitter 200 or the receiver 100 through, for example, system information, but it is not limited thereto. The storage device 110 of the receiver 100 may also store a precoding codebook with a set of predefined codewords or precoding matrices as same as those predefined in the storage device 210.

The receiver 100 may then transmit a set of indices of precoding matrices or a set of precoding matrices and one or more scalar coefficient(s) to the transmitter 200 through data signaling or control signaling.

In some embodiments, the precoding codebook may be transmitter specific or receiver specific. In one embodiment, the transmitter 200 and/or the receiver 100 may further be configured in a specific transmission mode for applying precoding operations of the invention.

The transmitter 200 may receive the set of indices of precoding matrices and one or more scalar coefficients from the receiver 100 and generate a refined precoding matrix that is to be combined with a data signal and apply the refined precoding matrix for transmission, e.g. to precode the data signal according to the set of indices of precoding matrices and the one or more scalar coefficients. For example, in one embodiment, the transmitter 200 may obtain a set of precoding matrices from a finite codebook according to the set of indices of precoding matrices and apply a specific mathematics method with obtained precoding matrices and the one or more scalar coefficients, such as by interpolating between the obtained precoding matrices using the one or more scalar coefficients, to generate the refined precoding matrix. In some embodiments, the transmitter 200 may also generate the refined precoding matrix based on channel condition, transmission power, or other information regarding the receiver 100.

Figure 2:
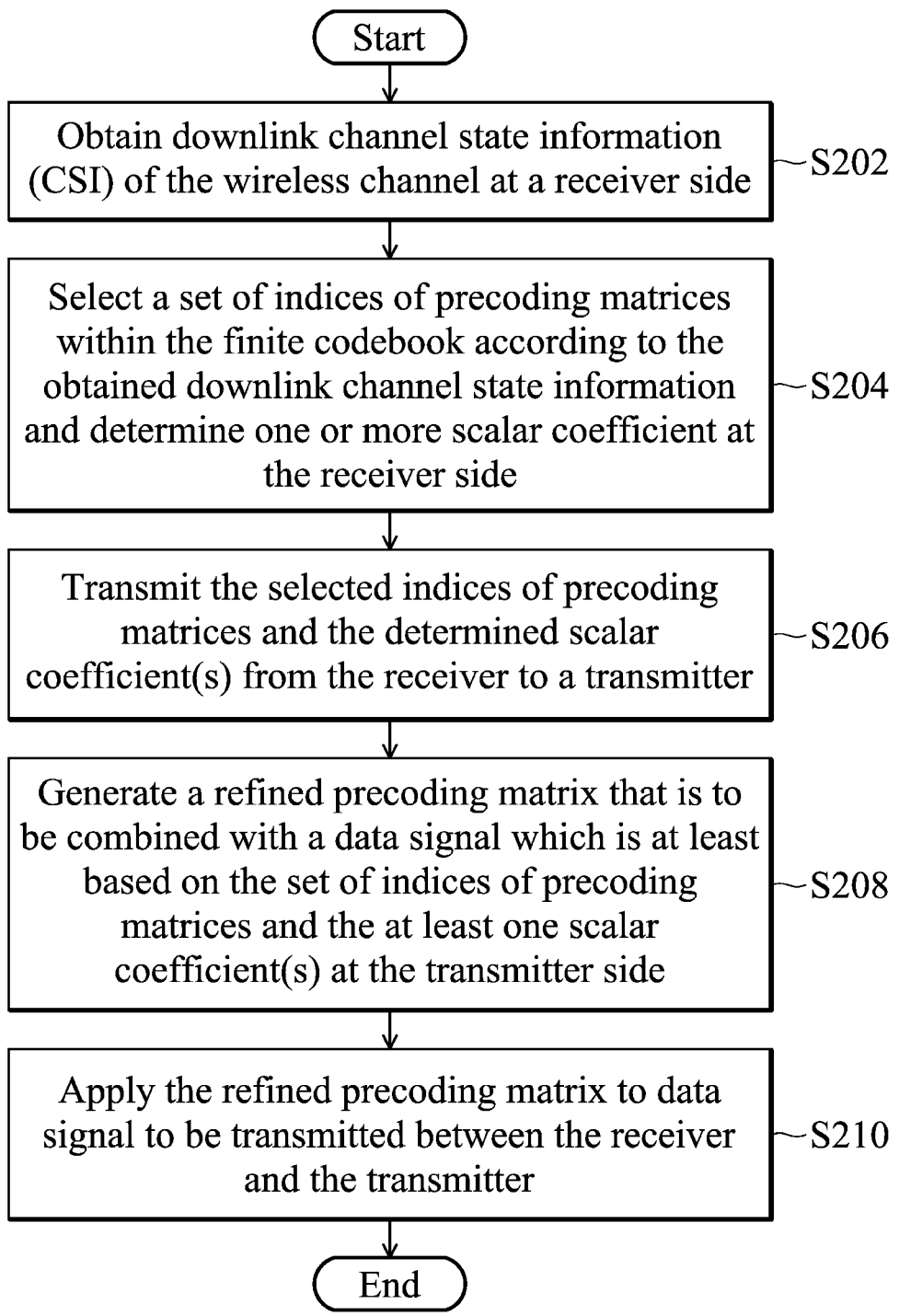
FIG. 2 is a flow chart illustrating a method for reducing the quantization effect of precoding operations utilizing a finite codebook in MIMO or multiple-input single-output (MISO) systems from a transmitter to a receiver according to an embodiment of the invention.

FIG. 2 is a flow chart illustrating a method for reducing the quantization effect of precoding operations utilizing a finite codebook in MIMO systems from a transmitter to a receiver according to an embodiment of the invention. The method can be applied to an MIMO wireless communication system as shown in FIG. 1. In this embodiment, the receiver 100 is wirelessly connected to the transmitter 200 which initiates a precoding operation via a wireless channel. First, in step S202, the receiver 100 obtains downlink channel state information (CSI) about the wireless channel via the decoder 130. After obtaining the downlink channel state information, in step S204, the receiver 100 selects a set of precoding matrix indices within the finite codebook according to the obtained downlink channel state information and determines the one or more scalar coefficients based on the set of precoding matrix indices. Note that the receiver 100 may select a number of precoding matrix indices within the finite codebook. For example, the receiver 100 may select two precoding matrix indices within the finite codebook which are the indices of the best and second best matrices among the precoding matrices.

After the set of indices of precoding matrices has been selected and the one or more scalar coefficients has been determined, in step S206, the receiver 100 transmits the selected indices of precoding matrices and the determined scalar coefficient(s) to the transmitter 200 via the decoder 130. Upon reception of the set of selected indices of precoding matrices and the determined scalar coefficient(s), in step S208, the transmitter 200 generates a refined precoding matrix that is to be combined with a data signal which is at least based on the set of indices of precoding matrices and the one or more scalar coefficients. After the refined precoding matrix has been generated, in step S210, the transmitter 200 applies the refined precoding matrix to data signals to be transmitted between the receiver 100 and the transmitter 200, e.g. to precode the data signals.

The one or more scalar coefficient may be determined based on the set of precoding matrix indices or the set of precoding matrices. In one embodiment, the set of precoding matrix indices or the set of precoding matrices may form a subspace and the one or more scalar coefficient(s) may be obtained by computing the projection of the optimal precoding matrix onto the subspace spanned by the set of precoding matrix indices or the set of precoding matrices. The distance between the precoding matrices such as the chordal distance, the projection 2-norm distance or the Fubini-Study distance may be applied to obtain the projection.

In some embodiments, the one or more scalar coefficients may be obtained by directly performing a numerical search such that the matrix distance between the precoding matrices and the optimal precoding matrix is minimized.

Because the refined precoding matrix is newly generated and expected to reduce quantization error, the refined precoding matrix introduces less quantization effect as compared with any single precoding matrix within the codebook.

It is to be noted that the number of indices of precoding matrices or precoding matrices for the set of indices of precoding matrices or precoding matrices is at least one. The one or more scalar coefficients may be represented by a field of a fixed size in the data signaling or control signaling format. In some embodiments, there may be a field in the data signaling or control signaling format to indicate the number of indices of precoding matrices or precoding matrices for the set of indices of precoding matrices or precoding matrices. Similarly, in some embodiments, there may be a field in the data signaling or control signaling format to indicate the number of scalar coefficients. In some embodiments, the number of indices of precoding matrices or precoding matrices for the set of indices of precoding matrices or precoding matrices and the number of scalar coefficients for the scalar coefficients are predefined.

For explanation, one specific embodiment is illustrated in the following to explain the detailed process of a method for multi-user detection of the invention, and those skilled in the art will understand that this specific embodiment is used for explanation only and the invention is not limited thereto.

Figure 3:
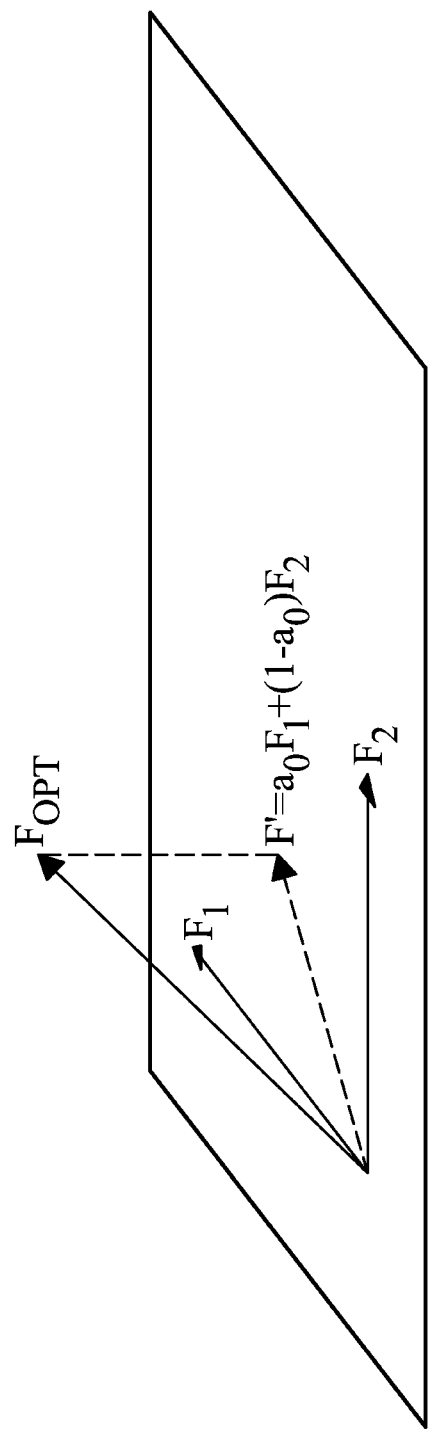
FIG. 3 is a schematic illustrating an example for determining one or more scalar coefficients in the precoding operations based on a set of indices of precoding matrices within the finite codebook and generating a refined precoding matrix based on the set of indices of precoding matrices and the one or more scalar coefficients according to another embodiment of the invention.

FIG. 3 is a schematic illustrating an example for determining one or more scalar coefficients in the precoding operations based on a set of indices of precoding matrices within the finite codebook and generating a refined precoding matrix based on the set of indices of precoding matrices and the one or more scalar coefficients according to another embodiment of the invention. Please refer to FIG. 3. In this embodiment, two precoding matrix indices along with one coefficient are provided to the transmitter 200 for generating a refined precoding matrix. In FIG. 3, for a particular channel realization and performance criterion, the best and the second-best precoding matrices within a given codebook can be determined and denoted by $F_1$ and $F_2$ respectively. Further, the optimal precoding matrix corresponding to the aforementioned channel realization and performance criterion is denoted by $F_{opt}$.

The optimal precoding matrix $F_{opt}$ may be determined by, for example, the minimum square error (MSE) or the achieved link capacity measurement for all of the precoding matrices within the given codebook. The coefficient, denoted by $a_0$, can be thus determined by the following formula:

$$a_0 = \mathrm{argmin}_a d(F_{opt}, aF_1 + (1-a)F_2) \qquad (2),$$

where d( ) calculates the distance between two matrices and where a is a parameter ranged from 0 to 1 for determining whether the matrix distance between the precoding matrices $F_1$, $F_2$ and the optimal precoding matrix $F_{opt}$ is minimized. Based on the adopted performance criterion and the codebook design rule, different definitions of a matrix distance can be applied, e.g., the chordal, Fubini-Study or projection 2-norm distances. In one embodiment, the coefficient $a_0$ may also be obtained by computing the projection of the optimal precoding matrix $F_{opt}$ onto the subspace spanned by the set of indices of precoding matrices or the set of precoding matrices $F_1$ and $F_2$, wherein the matrix distance such as the chordal distance, the projection 2-norm distance or the Fubini-Study distance may be applied to obtain the projection.

By sending $F_1$, $F_2$, and $a_0$ to the transmitter 200, a refined precoding matrix $F' = a_0 F_1 + (1-a_0) F_2$ with less quantization effect as compared to the best precoding matrix $F_1$ within the codebook can be generated to precode data signals to be transmitted between the transmitter and the receiver.

In summary, according to the method for wireless communication in an MIMO system of the invention, the receiver is allowed to feed back multiple indices of the precoding matrices using a finite codebook along with some auxiliary information related to the geometric structure among the precoding matrices to the transmitter such that a refined precoding matrix which is expected to reduce the quantization error can be generated at the transmitter side, thus, reducing the quantization effect of precoding operations. Moreover, with the method for wireless communication in an MIMO system of the invention, the degree of freedom in generating precoding matrices and thus the quantization effect can be largely improved even with a small codebook.

In some embodiments, to further enhance performance, the receiver may perform a numerical search to find the optimal pair of precoding matrices such that the distance between $F_{opt}$ and the constructed refined precoding matrix is minimized.

In one embodiment, a method for reducing the quantization effect of precoding operations utilizing multiple finite codebooks in MIMO systems is further provided to support such multiple-codebook approaches.

Figure 4:
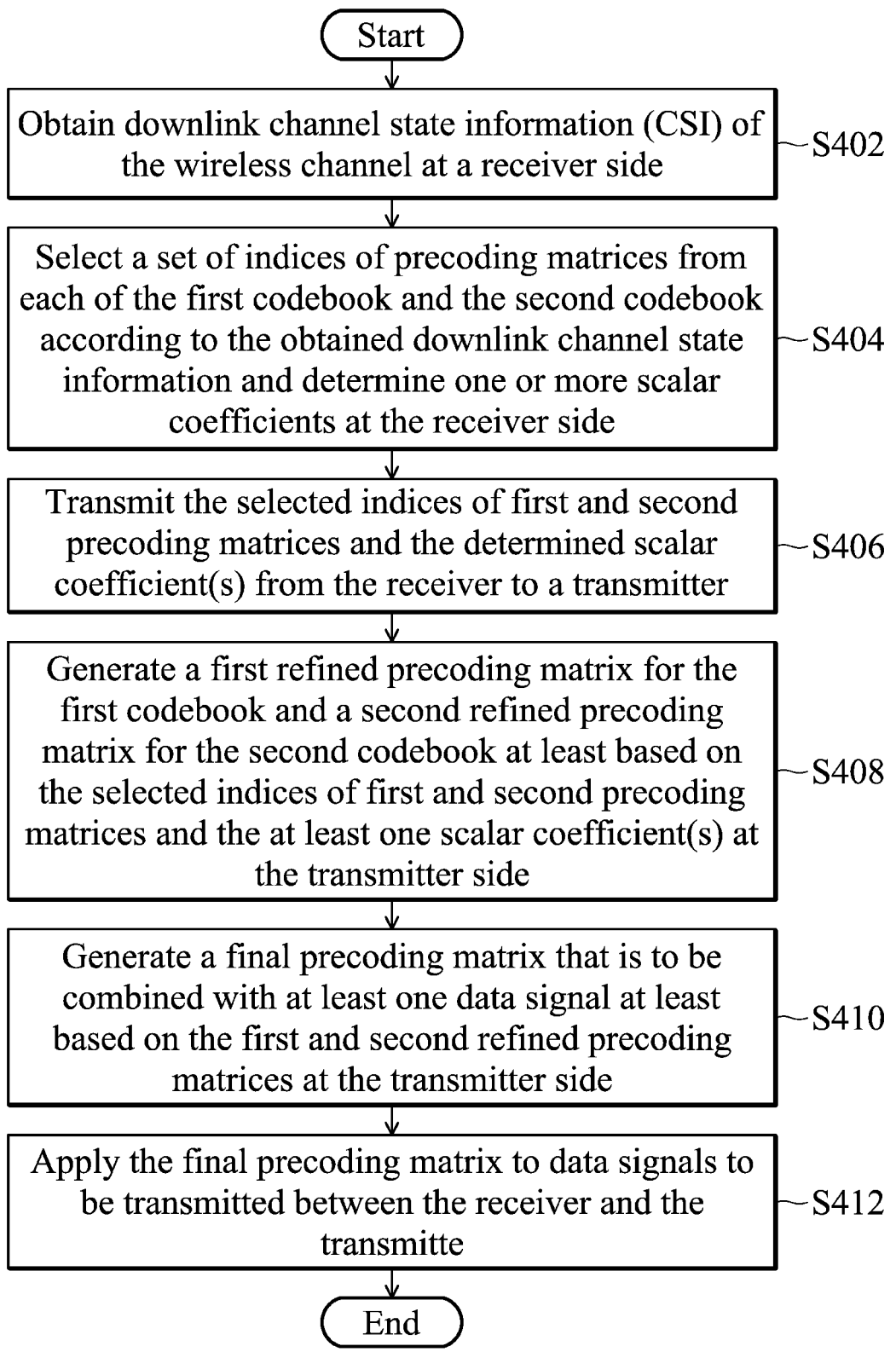
FIG. 4 is a flow chart illustrating a method for reducing the quantization effect of precoding operations utilizing at least two finite codebooks in MIMO systems from a transmitter to a receiver according to another embodiment of the invention.

FIG. 4 is a flow chart illustrating a method for reducing the quantization effect of precoding operations utilizing at least two finite codebooks in MIMO systems from a transmitter to a receiver according to another embodiment of the invention. The method can also be applied to an MIMO wireless communication system as shown in FIG. 1. Similarly, in this embodiment, the receiver 100 is wirelessly connected to the transmitter 200 which initiates a precoding operation via a wireless channel, and a first codebook and a second codebook are utilized. The first codebook comprises a number of first precoding matrices and the second codebook comprises a number of second precoding matrices.

First, in step S402, the receiver 100 obtains downlink channel state information (CSI) about the wireless channel via the decoder 130. After obtaining the downlink channel state information, in step S404, the receiver 100 selects a set of indices of precoding matrices from each of the first codebook and the second codebook according to the obtained downlink channel state information and determines one or more scalar coefficients via the decoder 130. Note that the receiver 100 may select a number of indices of precoding matrices within each codebook. For example, the receiver 100 may select two indices of the first precoding matrices within the first codebook which are the indices of the best and second best matrices among the first precoding matrices and select two indices of the second precoding matrices within the second codebook which are the indices of the best and second best matrices among the second precoding matrices. The one or more scalar coefficients may be determined based on the set of indices of precoding matrices or the set of precoding matrices. In one embodiment, the set of indices of precoding matrices or the set of precoding matrices may form a subspace and the one or more scalar coefficient(s) may be obtained by computing the projection of the optimal precoding matrix onto the subspace spanned by the set of indices of precoding matrices or the set of precoding matrices. The distance between the precoding matrices such as the chordal distance, the projection 2-norm distance or the Fubini-Study distance may be applied to obtain the projection. In some embodiments, the one or more scalar coefficients may also be obtained by directly performing a numerical search such that the matrix distance between the precoding matrices and the optimal precoding matrix is minimized. In one embodiment, the set of the at least one scalar coefficient(s) may be chosen such that the at least one final precoding matrix is equal to the precoding matrix computed using matrix operations, e.g., matrix product, with precoding matrices from the set of the at least one codebook. The set of the at least one scalar coefficient(s) may be, for example, a scalar coefficient, a scalar vector(s) or a scalar matrix (matrices) set, but it is not limited thereto.

After the set of indices of precoding matrices has been selected for each of the first and second codebooks and the one or more scalar coefficients has been determined, in step S406, the receiver 100 transmits the selected indices of the first and second precoding matrices and the determined scalar coefficient(s) to the transmitter 200 via the decoder 130. Upon reception of the set of selected indices of precoding matrices for each of the first and second codebooks and the determined scalar coefficient(s), in step S408, the transmitter 200 generates a first refined precoding matrix at least based on the set of indices of the first precoding matrices and the one or more scalar coefficients and a second refined precoding matrix at least based on the set of indices of the second precoding matrices and the one or more scalar coefficients and then generates, in step S410, a final precoding matrix that is to be combined with at least one data signal at least based on the first and the second refined precoding matrices. Because the final precoding matrix is newly generated and expected to reduce quantization error, the final precoding matrix introduces less quantization effect as compared with any single precoding matrix within each of the codebooks.

After the final precoding matrix has been generated, in step S412, the transmitter 200 applies the final precoding matrix to data signals to be transmitted between the receiver 100 and the transmitter 200, e.g. to precode the data signals.

In some embodiments, each of the first and second refined precoding matrices may be combined together using a matrix operation, e.g., matrix product, to obtain at least one final precoding matrix which is used to precode the at least one data signal. The matrix product may be, for example, a Kronecker product, a Frobenius inner product, a linear transformation of the matrix product operation and so on, but it is not limited thereto.

In some embodiments, the set of indices of precoding matrices or the set of precoding matrices may be taken from one or more precoding codebooks. It is to be noted that the number of indices of precoding matrices or precoding matrices for the set of indices of precoding matrices or precoding matrices is at least one. The one or more scalar coefficients may be represented by a field of a fixed size in a data signaling or control signaling format. In some embodiments, there may be a field in the data signaling or control signaling format to indicate the number of indices of precoding matrices or precoding matrices for the set of indices of precoding matrices or precoding matrices. Similarly, in some embodiments, there may be a field in the data signaling or control signaling format to indicate the number of scalar coefficients. In some embodiments, the number of indices of precoding matrices or precoding matrices for the set of indices of precoding matrices or precoding matrices and the number of scalar coefficients for the scalar coefficients are predefined.

In some embodiments, each of the precoding codebooks may be sent by the data signaling or control signaling during a specific period and the periods for sending the data signaling or control signaling may be different for different precoding codebooks.

In some embodiments, the set of the at least one index of precoding matrices or the set of the at least one precoding matrix may be chosen by performing a numerical search such that a predetermined performance metric is optimized.

The set of the at least one scalar coefficient(s) may be chosen such that the refined precoding matrix is equal to the matrix product of precoding matrices taken from a same or different codebooks. In one embodiment, the at least one refined precoding matrix may be constructed using the set of the at least one index of precoding matrices or the set of the at least one precoding matrix and the set of the at least one scalar coefficient(s) by performing linear operations, e.g., formula $W=a*C_1+b*C_2$, where W represents the refined precoding matrix; $C_1$ and $C_2$ represent the precoding matrices taken from the same precoding codebook; a and b represent the set of the at least one scalar coefficient(s), or the derivation of the set of the at least one scalar coefficient(s). For example, a and b may have the relationship that $b=1-a$, that is, $W=a*C_1+(1-a)*C_2$. In one embodiment, the at least one refined precoding matrix may be constructed for each of the precoding codebook(s), e.g., formulas $W_1=a*C_1+b*C_2$, and $W_2=c*F_1+d*F_2$, where $F_1$ and $F_2$ represent precoding matrices taken from a different precoding codebook from that of $C_1$ and $C_2$; c and d represent the set of the at least one scalar coefficient(s), or the derivation of the set of the at least one scalar coefficient(s).

In another embodiment, the set of the at least one scalar coefficient(s) may be chosen such that the refined precoding matrix is equal to the matrix product of precoding matrices taken from different codebooks, e.g., formula $W=a*C_1+b*C_2=C_3 \cdot F_1$, where $C_3$ represents a precoding matrix taken from the same precoding codebook as that of $C_1$ and $C_2$ and $F_1$ represents a precoding matrix taken from a different codebook. For example, the formula $W=a*C_1+b*C_2=C_3 \cdot F_1$ can have the relationship that $C_3=C_1$ or $C_3=C_2$. Similarly, it is to be noted that the matrix product may be, for example, a Kronecker product or a Frobenius inner product, or a linear transformation of the matrix product operation. In one embodiment, the precoding matrices taken from different codebooks for performing the matrix product operation may have at least one precoding matrix which is a diagonal matrix or an identity matrix. For example, in the formula $W=a*C_1+b*C_2=C_3 \cdot F_1$ $F_1$ can be a diagonal or an identity matrix.

In some embodiments, the at least one refined precoding matrix $W_1$ and $W_2$ may be combined together using a matrix operation, e.g. a Kronecker product, a Frobenius inner product, or a linear transformation of the matrix product operation, to obtain the final precoding matrix $W_{final}$, e.g., formula $W_{final}=W_1 \cdot W_2$. In some embodiments, the at least one refined precoding matrix $W_1$ and $W_2$ can be combined together using the aforementioned matrix operation to obtain the final precoding matrix $W_{final}$, e.g., formula $W_{final} = e*W_1 + f*W_1 = W_1 \cdot W_2$, where e and f represent the set of the at least one scalar coefficient(s) or the derivation of the one or more scalar coefficients.

Thus, with the method for wireless communication in an MIMO system of the invention, the receiver is also allowed to feed back multiple indices of the precoding matrices using multiple finite codebooks along with some auxiliary information related to the geometric structure among the precoding matrices to the transmitter such that a final precoding matrix which is expected to reduce quantization error can be generated according to at least one refined precoding matrix for each of the utilized codebooks at the transmitter side, thus, reducing the quantization effect of precoding operations and largely improving the degree of freedom in generating precoding matrices even with a small codebook.

Methods for wireless communication in an MIMO system and systems thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for wireless communication in a multiple-input multiple-output (MIMO) system, between a transmitter and a receiver, comprising:
    obtaining downlink channel state information at the receiver side;
    determining a first optimum matrix and a second optimum matrix according to the obtained downlink channel state information at the receiver side;
    selecting a first set of information from a first finite codebook and a second set of information from a second finite codebook according to the obtained downlink channel state information at the receiver side;
    determining first scalar coefficients based on the first set of information at the receiver side, wherein the first scalar coefficients are determined by calculating a projection of the first optimal matrix onto a subspace spanned by the first set of information;
    determining second scalar coefficients based on the second set of information at the receiver side, wherein the second scalar coefficients are determined by calculating a projection of the second optimal matrix onto a subspace spanned by the second set of information;
    transmitting the first set of information, the second set of information, the first scalar coefficients and the second scalar coefficients from the receiver to the transmitter;
    generating a first refined precoding matrix based on the first set of information and the first scalar coefficients and generating a second refined precoding matrix based on the second set of information and the second scalar coefficients at the transmitter side;
    generating a final precoding matrix based on at least the first refined precoding matrix and the second refined precoding matrix at the transmitter side; and
    applying the final precoding matrix to precode data signals to be transmitted from the transmitter to the receiver to reduce the quantization effect of precoding operations.

2. The method of claim 1, wherein the step of generating the final precoding matrix further comprises generating the final precoding matrix by performing a specific matrix operation on the first refined precoding matrix and the second refined precoding matrix.

3. The method of claim 2, wherein the one or more scalar coefficients are chosen such that the final precoding matrix is equal to a precoding matrix which is computed by using a matrix operation with precoding matrices from each of the finite codebooks.

4. The method of claim 1, wherein the first or the second refined precoding matrix is determined by the following formula:

$$W = a*C1 + b*C1,$$

where W represents the refined precoding matrix, C1 and C2 represent the set of precoding matrices taken from the same finite codebook, and a and b represent the scalar coefficients or a derivation of the scalar coefficients.

5. The method of claim 4, wherein the one or more scalar coefficients are chosen such that the first or the second refined precoding matrix is equal to the matrix product of precoding matrices taken from different finite codebooks and is determined by the following formula:

$$W = a*C1 + b*C2 = C3 \cdot F1,$$

where C3 represents a precoding matrix taken from the same finite codebook as that of C1 and C2, and F1 represents a precoding matrix taken from a different finite codebook.

6. The method of claim 5, wherein C3=C1 or C3=C2.

7. The method of claim 5, wherein the precoding matrices taken from different finite codebooks for performing the matrix product operation comprises at least one precoding matrix which is a diagonal matrix or an identity matrix.

8. The method of claim 4, wherein the first refined precoding matrix W1 and the second refined precoding matrix W2 are constructed for first and second finite codebooks respectively and are determined by the following formula:

$$W1 = a*C1 + b*C2 \text{ and } W2 = c*F1 + d*F2,$$

where F1 and F2 represent precoding matrices taken from a different finite codebook from that of C1 and C2 and c and d represent the scalar coefficients or the derivation of the scalar coefficients.

9. The method of claim 8, wherein the final precoding matrix $W_{final}$ is determined by the following formula:

$$W_{final} = W1 \cdot W2,$$

where symbol · represents the matrix product of the refined precoding matrices W1 and W2, and the matrix product is the Kronecker product, the Frobenius inner product, or the linear transformation of the matrix product operation.

10. The method of claim 1, wherein the one or more scalar coefficients is determined based on the set of indices of precoding matrices or the set of precoding matrices.

11. The method of claim 10, wherein the one or more scalar coefficients is determined by calculating a projection of an optimal precoding matrix onto a subspace spanned by the set of indices of precoding matrices or the set of precoding matrices, wherein the projection is represented by a distance between the precoding matrices.

12. The method of claim 11, wherein the one or more scalar coefficients is determined by directly performing a numerical search to minimize the matrix distance between the set of precoding matrices.

13. The method of claim 1, wherein each of the plurality of codebooks is predefined or configurable by the transmitter, the number of the scalar coefficients is predefined, and the number of indices for the set of indices of the precoding matrices is predefined.

14. A multiple-input multiple-output (MIMO) system, comprising:
a receiver, configured for obtaining downlink channel state information of a wireless channel, for selecting a first set of information from a first finite codebook and a second set of information from a second finite codebook according to the obtained downlink channel state information, for determining first scalar coefficients based on the first set of information, wherein the first scalar coefficients are determined by calculating a projection of the first optimal matrix onto a subspace spanned by the first set of information, for determining second scalar coefficients based on the second set of information, wherein the second scalar coefficients are determined by calculating a projection of the second optimal matrix onto a subspace spanned by the second set of information, and for transmitting the first set of information, the second set of information, the first scalar coefficients and the second scalar coefficients to the transmitter; and
a transmitter coupled to the receiver, configured for receiving the first set of information, the second set of information, the first scalar coefficients and the second scalar coefficients, for generating a first refined precoding matrix based on the first set of information and the first scalar coefficients and generating a second refined precoding matrix based on the second set of information and the second scalar coefficients, for generating a final precoding matrix based on at least the first refined precoding matrix and the second refined precoding matrix, and for applying the final precoding matrix to precode data signals to be transmitted from the transmitter to the receiver to reduce the quantization effect of precoding operations.

15. The system of claim 14, wherein the transmitter is configured to generate the final precoding matrix by performing a specific matrix operation on the first refined precoding matrix and the second refined precoding matrix.

16. The system of claim 14, wherein the transmitter is a network/base station or user equipment and the receiver is a user equipment or network/base station.

17. A receiver coupled to a transmitter via a wireless channel in an MIMO wireless communication system, comprising:
a decoder, and a processor, the receiver is configured for obtaining downlink channel state information about the wireless channel, for selecting a first set of information from a first finite codebook and a second set of information from a second finite codebook according to the obtained downlink channel state information at the receiver side, for determining first scalar coefficients based on the first set of information at the receiver side, wherein the first scalar coefficients are determined by calculating a projection of the first optimal matrix onto a subspace spanned by the first set of information, for determining second scalar coefficients based on the second set of information at the receiver side, wherein the second scalar coefficients are determined by calculating a projection of the second optimal matrix onto a subspace spanned by the second set of information, and for transmitting the first set of information, the second set of information, the first scalar coefficients and the second scalar coefficients to the transmitter via the wireless channel.

18. The method of claim 1, wherein the first set of information is a set of indices of precoding matrices from the first finite codebook, and the second set of information is a set of indices of precoding matrices from the second finite codebook.

19. The system of claim 14, wherein the first set of information is a set of indices of precoding matrices from the first finite codebook, and the second set of information is a set of indices of precoding matrices from the second finite codebook.

20. The receiver of claim 17, wherein the first set of information is a set of indices of precoding matrices from the first codebook, and the second set of information is a set of indices of precoding matrices from the second codebook.

* * * * *